UNITED STATES PATENT OFFICE.

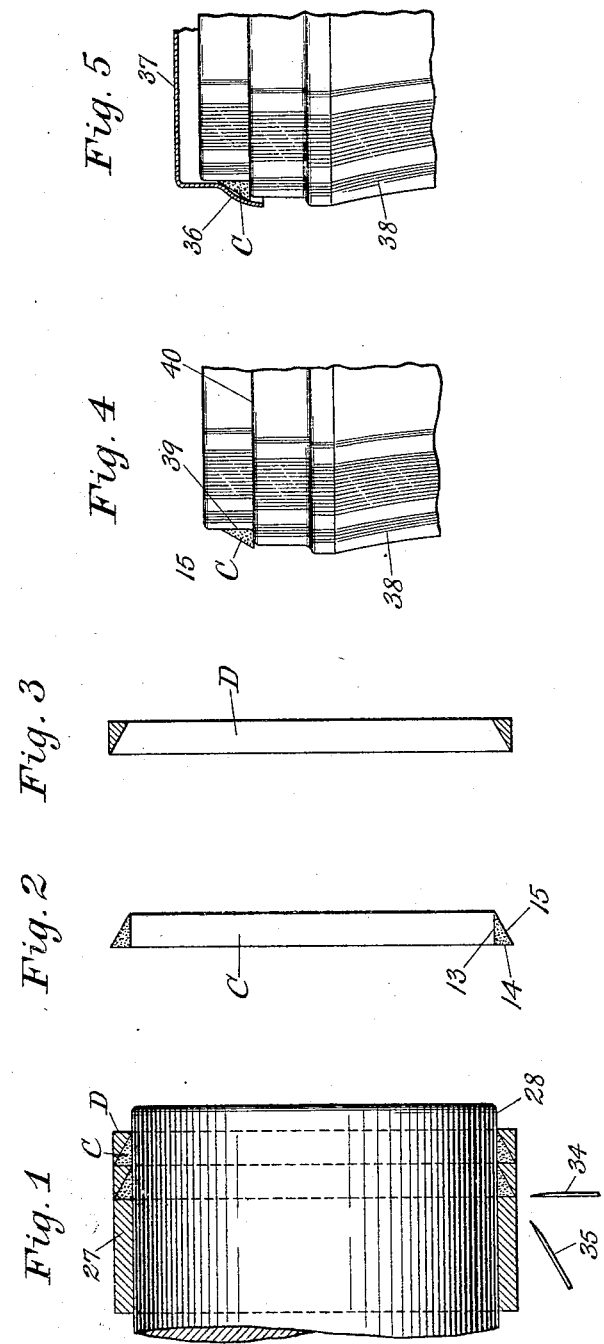

WILLIAM A. LORENZ, OF HARTFORD, CONNECTICUT, ASSIGNOR OF ONE-HALF TO BEECH-NUT PACKING COMPANY, OF CANAJOHARIE, NEW YORK, A CORPORATION OF NEW YORK, ONE-FOURTH TO HIMSELF, AND ONE-FOURTH TO WILLIAM H. HONISS, OF HARTFORD, CONNECTICUT.

HERMETIC CLOSURE.

No. 930,298.      Specification of Letters Patent.      Patented Aug. 3, 1909.

Original application filed November 30, 1906, Serial No. 345,623. Divided and this application filed April 24, 1908. Serial No. 428,973.

*To all whom it may concern:*

Be it known that I, WILLIAM A. LORENZ, a citizen of the United States, and resident of Hartford, in the county of Hartford and State of Connecticut, have invented certain new and useful Improvements in Hermetic Closures, of which the following is a full, clear, and exact specification.

This invention consists in an improved hermetic closure for jars and other receptacles, employing a cap having a flaring rim or flange, and a sealing gasket, the cross-section of which is a right angled triangle, the right angled corner of which rests against a similarly shaped sealing seat upon the jar, the gasket being pressed against that seat by the flaring flange of the cap, engaging with the inclined side or face of the gasket.

This application is a division of my prior application Serial No. 345,623, filed Nov. 30, 1906, in which I have shown and described this particular form of gasket in connection with other and related forms of gasket; and have also shown, described and more broadly claimed an improved process of making such gaskets.

Figure 1 is a side view exactly like Fig. 9 of my said prior application, showing this closure gasket and illustrating a process of making that gasket from a tube of gasket material. Figs. 2 and 3 are side views showing the gaskets C and D of reverse form produced by the method of manufacture illustrated in Fig. 1. Figs. 4 and 5 are side views of a jar illustrating the closure and its application to the jar, Fig. 4 showing the gasket placed in position thereon, while Fig. 5 shows the sealing cap placed upon the gasket in proper position to complete the closure.

This closure is of the class known as wedging closures, which in this instance is illustrated as an external closure, being applied around the outer surface of the neck of the jar. The two sides 13 and 14 of the gasket which are at substantially right angles with each other are seated against the outer cylindrical surface 39, and the horizontal shoulder 40, respectively of the jar 38. The tapering or flaring flange 36 of the cap or cover 37 approximately conforms to the oblique or inclined side 15 of the gasket, and upon being forced down makes a tight closure joint between the cap and the jar by compressing the gasket C downwardly and inwardly against its seat upon the jar.

The contour of the gasket C, of which only a cross-section is shown in Figs. 4 and 5 is better understood by reference to Figs. 1, 2 and 3, which illustrate a process of making them from a tube or sleeve of gasket material, which process is claimed broadly in my aforesaid prior patent application Serial No. 345,623. The right angled triangular gaskets C and D and the process of making them from a tube, which is illustrated in Figs. 1, 2 and 3, form the subject matter of another divisional application, Serial No. 428,972, filed contemporaneously herewith. The tube 27 is mounted upon a mandrel 28, the gaskets or rings C and D are alternately severed from the tube by the operation of the knives 34 and 35 or by the operation of a single knife operating alternately in the two positions shown in Fig. 1. The two gaskets C and D are of a reverse contour; but being made of flexible material they may be reversed so that either of them may be brought into conformity with the other, according to the form best suited to the closure which is to be made. In the present instance, to suit the closure shown in Figs. 4 and 5 the alternate gaskets D should be reversed so as to bring them into conformity with the gaskets C. This reversal of the gasket is also claimed in my aforesaid contemporaneously pending application.

I claim as my invention:—

1. The combination with a receptacle having a rim or neck and a flange at the upper end, and a cap having a flaring depending flange, of a gasket triangular shaped in cross section, furnishing a lower right angle corner, a lower acute angle corner, and an upper acute angle corner, and presenting inner, lower, and outer contact faces conforming to and co-acting with the contact faces of the neck and flange of the receptacle and the flange of the cap, with the lower right angle corner entering into the corner joining the neck and flange of the receptacle, substantially as described.

2. A closure for hermetically sealed receptacles, comprising a gasket having a triangular shape in cross section and furnishing a straight plain inner face, a straight plane lower face, and an oblique outer face, and a cap having a depending flange with an inner seating face engaging the inclined or oblique outer face of the gasket and forcing the gasket as a whole downwardly and inwardly, substantially as described.

3. A closure for hermetically sealed receptacles, comprising a gasket having a triangular shape in cross section and furnishing a straight plain inner face, a straight plane lower face and an oblique outer face, and a cap having a depending flange with a straight section and an outwardly curved section, the outwardly curved section furnishing a bearing face against the oblique outer face of the gasket for forcing the gasket as a whole downwardly and inwardly, substantially as described.

In testimony whereof I have signed my name to this specification in the presence of two subscribing witnesses.

WILLIAM A. LORENZ.

Witnesses:
HANS MALLNER,
EDWARD H. LORENZ.